US007561453B2

(12) United States Patent
Hallak

(10) Patent No.: US 7,561,453 B2
(45) Date of Patent: Jul. 14, 2009

(54) METHOD FOR OPERATING AN INVERTER AND ARRANGEMENT FOR EXECUTING THE METHOD

(75) Inventor: Jalal Hallak, Vienna (AT)

(73) Assignee: Siemens AG Osterreich, Vienna (AT)

( * ) Notice: Subject to any disclaimer, the term of this patent is extended or adjusted under 35 U.S.C. 154(b) by 253 days.

(21) Appl. No.: 11/632,334

(22) PCT Filed: Jul. 11, 2005

(86) PCT No.: PCT/EP2005/007486

§ 371 (c)(1),
(2), (4) Date: Jan. 12, 2007

(87) PCT Pub. No.: WO2006/005562

PCT Pub. Date: Jan. 19, 2006

(65) Prior Publication Data

US 2008/0212348 A1    Sep. 4, 2008

(30) Foreign Application Priority Data

Jul. 12, 2004   (AT) .............................. A 1178/2004

(51) Int. Cl.
*H02M 7/5387* (2007.01)
*H02M 7/44* (2006.01)
(52) U.S. Cl. ........................................ 363/132; 363/98
(58) Field of Classification Search .................... 363/95, 363/97, 98, 123, 124, 131, 132
See application file for complete search history.

(56) References Cited

U.S. PATENT DOCUMENTS

| 5,969,484 A | 10/1999 | Santi et al. |
| 6,515,883 B2 * | 2/2003 | Wade .......................... 363/123 |
| 2002/0097011 A1 | 7/2002 | Weirich |

FOREIGN PATENT DOCUMENTS

| DE | 196 42 522 C1 | 4/1998 |
| EP | 1 076 403 A2 | 2/2001 |

OTHER PUBLICATIONS

Sanjaya Maniktala, "Slave converters power auxiliary outputs", EDN, Oct. 17, 2002, pp. 1-10.
R. Itoh and K. Ishizaka, "Single-phase sinusoidal rectifier with step-up/down characteristics", IEE Proceedings-B, vol. 138, No. 6, Part B, Nov. 1991, pp. 338-344, XP000267844.
C.M. Penalver, J. Peire and P.M. Martinez, "Microprocessor control of DC/AC static converters", IEEE Transactions on Industrial Electronics, vol. IE-32, No. 3, pp. 186-191, 1985, Abstract.

* cited by examiner

*Primary Examiner*—Gary L Laxton

(57) ABSTRACT

There is described a method for operating an electronically controlled inverter. The inverter is controlled during the positive half-wave of the output alternating voltage in such a way that it operates as a SEPIC converter, and during the negative half-wave of the output alternating voltage in such a way that it operates as a CUK converter.

6 Claims, 4 Drawing Sheets

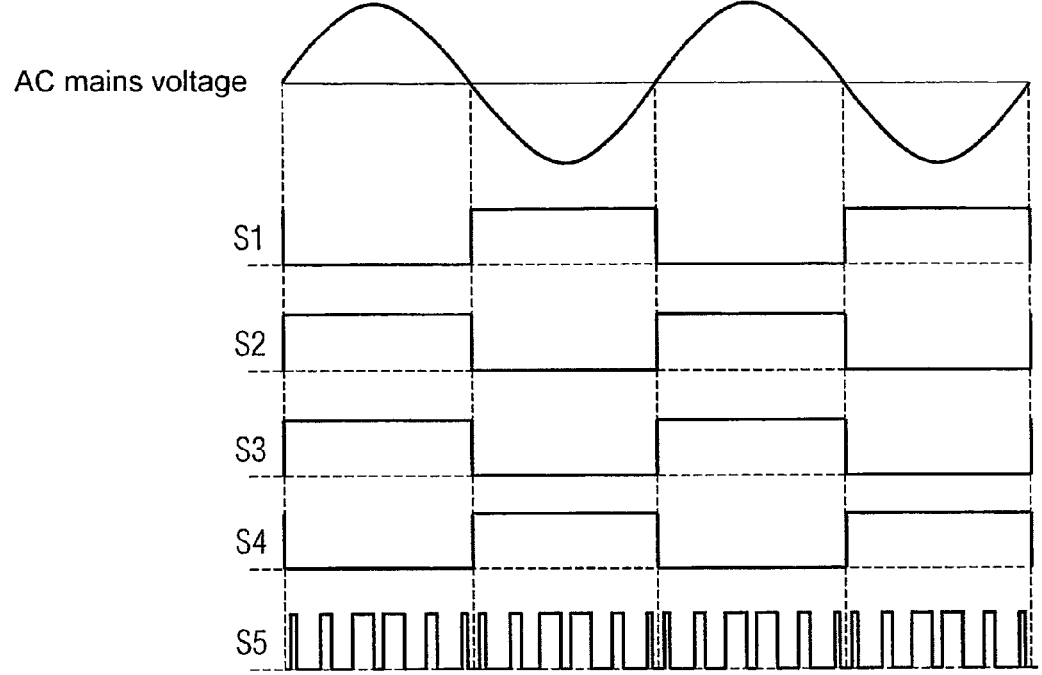

METHOD FOR OPERATING AN INVERTER AND ARRANGEMENT FOR EXECUTING THE METHOD

CROSS REFERENCE TO RELATED APPLICATIONS

This application is the US National Stage of International Application No. PCT/EP2005/007486, filed Jul. 11, 2005 and claims the benefit thereof. The International Application claims the benefits of Austrian application No. 1178/2004 A filed Jul. 12, 2004, both of the applications are incorporated by reference herein in their entirety.

FIELD OF INVENTION

The invention relates to a method for operating an electronically controlled inverter and to an arrangement for executing the method.

BACKGROUND OF INVENTION

Electronically controlled inverters are for example known from US-Z.: C. M. Penalver, et al "Microprocessor Control of DC/AC Static Converters"; IEEE Transactions on industrial Electronics, Vol. IE-32, No. 3, 1985, P. 186-191; They are used for example in solar power systems to transform the direct current created by the solar cells in such a way as to enable it to be fed into the public AC power network. Only in this way is a practically unrestricted use of solar-produced energy guaranteed.

One of the results of the plurality of applications for inverters has been the development of basic derivative types of step-up converters, step-up/step-down converters and step-down converters for specific applications. An article published in the periodical EDN dated 17 Oct. 2002 "Slave converters power auxiliary outputs", Sanjaya Maniktala is cited here as an example in which different possible combinations of basic inverter types are described.

SUMMARY OF INVENTION

An object of the invention is to further develop the inverters known from the prior art.

In accordance with the invention the object is achieved with a method of the type mentioned at the start, in which the inverter is controlled during the positive half-wave of the output alternating voltage in such a way that it operates as a SEPIC converter and in which the inverter is controlled during the negative half-wave of the output alternating voltage in such a way that it operates as a CUK converter.

The inventive combination of the functions of SEPIC and CUK converter lead to an especially low-loss inverter which is thus highly efficient and is therefore particularly suited for use in solar systems.

It is advantageous for the inverter to comprise a semiconductor bridge circuit formed from a first, second, third and fourth semiconductor switch, of which the first output is connected to a first terminal of an alternating current output of the inverter, of which the second output is connected to second terminal of the alternating current output of the inverter, also for a first choke to be provided of which the first side is connected to the positive pole of a direct current source and of which the second side is connected via a fifth semiconductor switch to the negative pole of the direct current source, for the connection between first choke and fifth semiconductor switch to be connected via a first capacitor to the first terminal of a second choke and the anode of a diode, for the second terminal of the second choke to be connected to the first input of the bridge circuit and the cathode of the diode to be connected to a second input of the bridge circuit, and for the negative pole of the direct current source to be connected to the second terminal of the alternating current output.

Furthermore it is advantageous if, by means of microcontrollers the second and third semiconductor switches are permanently switched on during the positive half-wave of the output alternating current and the first and fourth semiconductor switches are permanently switched off, and the fifth semiconductor switch is switched pulsed, and during the negative half-wave of the output alternating current, the first and fourth semiconductor switches are permanently switched on and the second and third semiconductor switches are permanently switched off and the fifth semiconductor switch is switched pulsed.

It is useful for a microcontroller to be provided which is appropriately programmed for control of the semiconductor switches.

BRIEF DESCRIPTION OF THE DRAWINGS

The invention is explained in greater detail with reference to Figures. The Figures typically show.

DETAILED DESCRIPTION OF INVENTION

The inverter shown in the Figures comprises a semiconductor bridge circuit made up of a first, second, third and fourth semiconductor switch S1, S2, S3, S4. The first output of the semiconductor bridge circuit formed from the connection of first and second semiconductor switches S1, S2 is connected to a first terminal of an alternating current output $U_{OUT}$ of the inverter. The second output of the semiconductor bridge circuit formed from the connection of third and fourth semiconductor switches S3, S4 is connected to a second terminal of an alternating current output $U_{OUT}$ of the inverter. Furthermore a first choke L1 is provided, of which the first side is connected to the positive pole of a direct current source $U_{IN}$ and of which the second side is connected via a fifth semiconductor switch S5 to the negative pole of the direct current source $U_{IN}$. The connection between first choke L1 and fifth semiconductor switch S5 is made via a first capacitor $C_C$ to the first terminal of a second choke L2 and the anode of a diode D1 and of the second terminal of the second choke L2 to a first input of the bridge circuit S1, S2, S3, S4 formed by the connection of first and third semiconductor switches S1, S3.

First and second choke L1, L2 can have a common core.

The cathode of the diode D1 is connected to a second input of the bridge circuit S1, S2, S3, S4 formed by the connection of second and fourth semiconductor switches S2, S4. Furthermore the negative pole of the direct current source $U_{IN}$ is connected to the second terminal of the alternating current output $U_{OUT}$.

Figure 1:
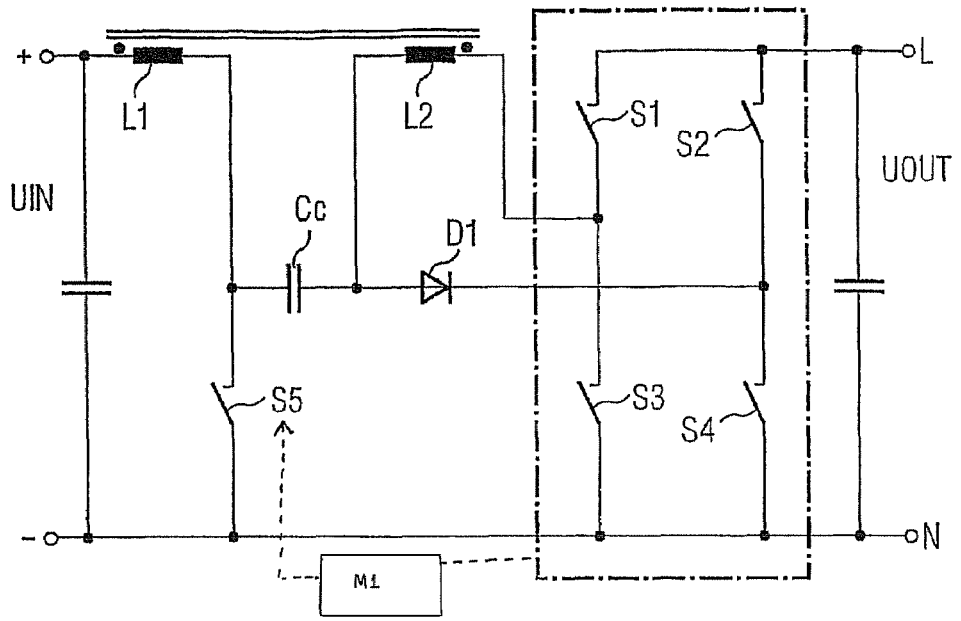
FIG. 1 the circuit diagram of a typical inverter.
Figure 2:
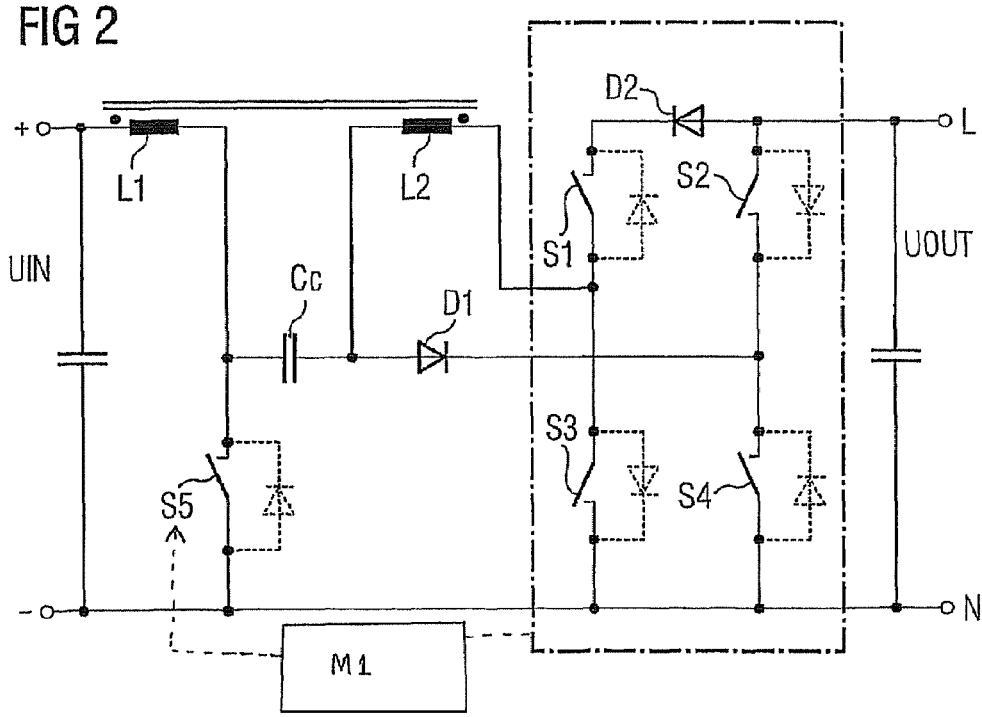
FIG. 2 the circuit diagram of a typical inverter when n-channel barrier layer MOSFETs are used.

When n-channel barrier layer MOSFETs are used as semiconductor switches S1, S2, S3, S4, S5, the direction of installation should be noted. Indicated in FIG. 2 by the diode symbol being shown as a dashed outline.

In this embodiment of the invention the use of a diode D2 is worthwhile, but its function can also be implemented however by a controlling the semiconductor switches in an appropriate manner.

The semiconductor switches are controlled by means of microcontrollers M1.

In this case, in accordance with the invention, the output alternating current of the second and third semiconductor switches S2, S3 is permanently switched on during the positive half-wave and that of the first and fourth semiconductor switches S1, S4 is permanently switched off, while the switching of the fifth semiconductor switch is pulsed.

During the negative half-wave of the output alternating current first and fourth semiconductor switches S1, S4 are permanently switched on and second and third semiconductor switches S2, S3 permanently switched off and the fifth semiconductor switch S5 is switched pulsed.

Figure 3:
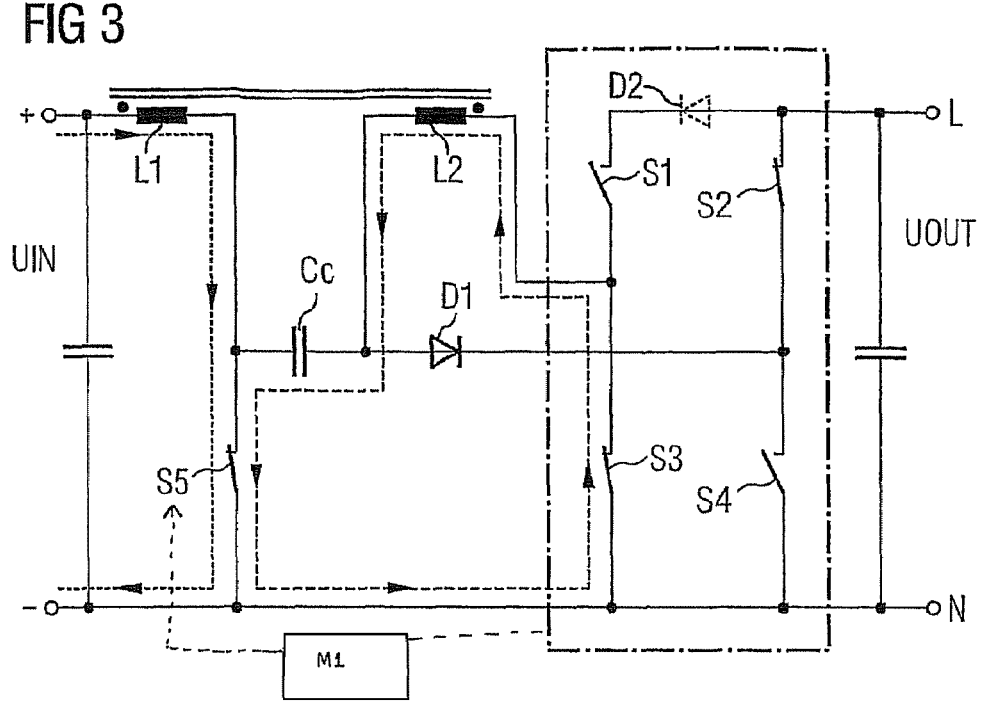
FIGS. 3, and 4 current flow and switching states in a typical inverter during the positive half-wave of the output alternating current, FIGS. 5 and 6 current flow and switching states in a typical inverter during the negative half-wave of the output alternating current, and FIG. 7 the signal timing of typical activation signals for the semiconductor switches.

FIG. 3 in this case shows the state in which the inverter accepts electrical energy from the direct current source $U_{IN}$ during a positive half-wave of the output voltage. To this end the fifth semiconductor switch S5 is closed and thereby a current path established between the positive pole of the direct current source $U_{IN}$ via the first choke L5 and the first semiconductor switch S1. A second circuit is forced by the energy stored in the capacitor $C_C$ via the fifth and the third semiconductor switches S5 and S3 and the second coil L2.

Figure 4:
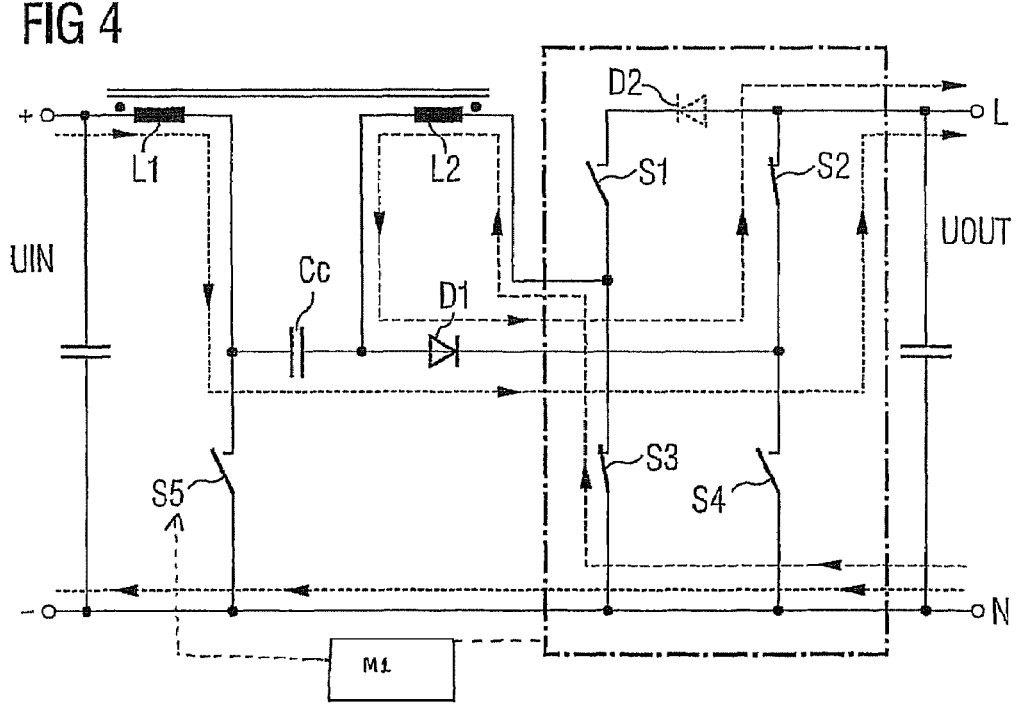

In this state the first choke L1 stores energy, which, as shown in FIG. 4, is output after the opening of the fifth semiconductor switch S5 via the first semiconductor diode D1 and the semiconductor bridge circuit to the alternating current output $U_{OUT}$ and simultaneously to the first capacitor $C_C$.

The energy stored in the second choke L2 is output after the opening of the fifth semiconductor switch S5 via semiconductor diode D1 and via the semiconductor bridge circuit to the alternating current output $U_{OUT}$.

The circuits produced in such cases run on one side from the positive pole of the direct current source $U_{IN}$ via the first choke L1, the first capacitor $C_C$, the diode D1, the second semiconductor switch S2 to the alternating current output $U_{OUT}$ and via the alternating current network to the negative pole of the direct current source $U_{IN}$ and one the other side from the second choke L2 via the diode D1 and the second semiconductor switch S2 to the alternating current output $U_{OUT}$ and via the alternating current network and the third semiconductor switch S3 back to the second choke L2.

The switching states during the negative half-wave of the output alternating current are now explained with reference to FIG. 5 and FIG. 6. As can also be seen from FIG. 7, the fifth semiconductor switch S5 is switched pulsed during this period, the first and the third semiconductor switches S1, S3 are permanently on and second and the fourth semiconductor switches S2, S4 permanently off. This means that in accordance with the invention the function of what is known as a CUK converter is executed during the negative half-wave of the output alternating current.

Figure 5:
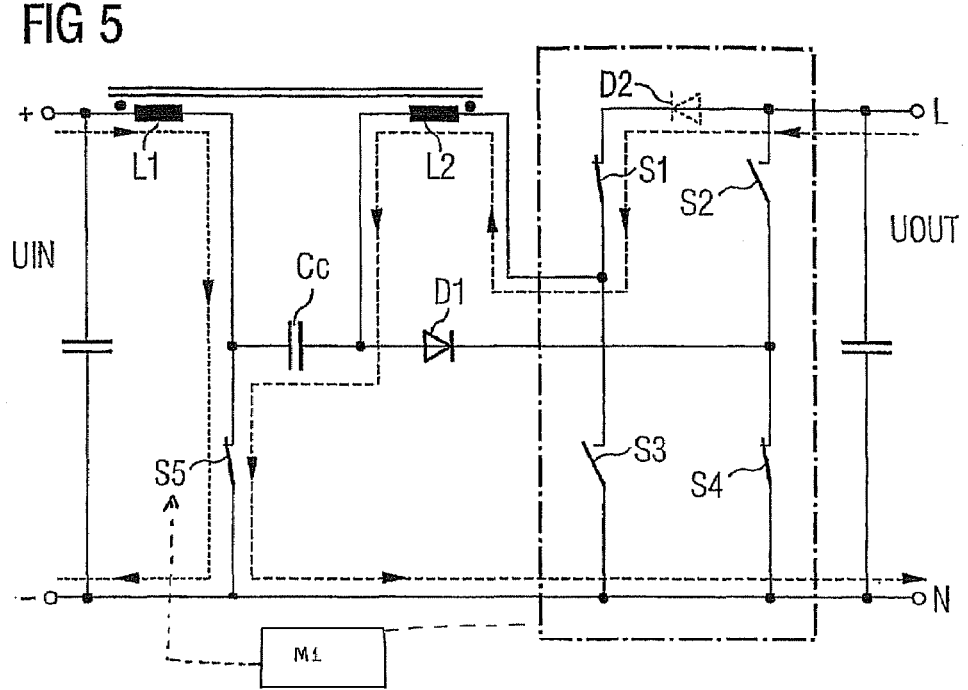

In this connection FIG. 5 shows the circumstances under which the fifth semiconductor switch S5 is closed. A current path is formed between the positive pole of the direct current source $U_{IN}$ via the first choke L1 and the fifth semiconductor switch S5 to the negative pole of the direct current source and a second current path via the second choke L2, first capacitor $C_C$, the fifth semiconductor switch S5, the output alternating current network $U_{OUT}$ and the first semiconductor switch S1.

Figure 6:
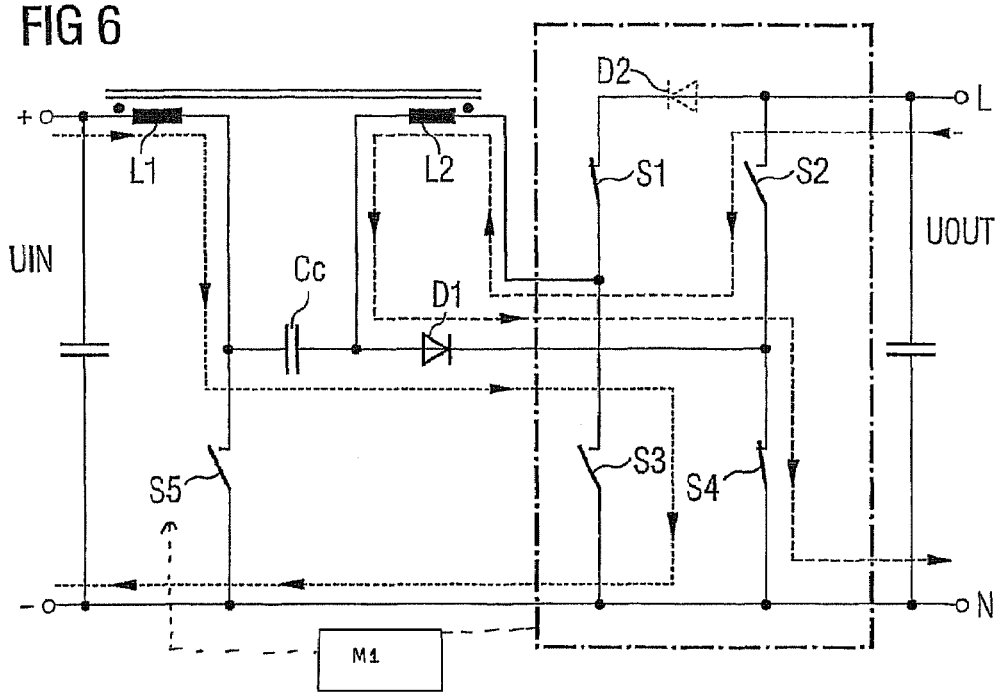

In the next switching process—as shown in FIG. 6—the fifth semiconductor switch S5 is opened.

The circuits thus produced run on one side from the positive pole of the direct current source $U_{IN}$ via the first choke L1, the first capacitor $C_C$, the diode D1 and the fourth semiconductor switch S4 to the negative pole of the direct current source $U_{IN}$ and on the other side via the second choke L2, the diode D1, the fourth semiconductor switch S4, the output alternating current network $U_{OUT}$ and the first semiconductor switch S1.

FIG. 7 shows the typical signal timing waveforms of the control signals for the semiconductor switches S1, S2, S3, S4 and S5.

The invention claimed is:

1. A method for operating an electronically controlled inverter, comprising:
   providing the inverter having an input terminal for a connection to a direct current source an output terminal for an alternating current, a plurality of switches, a first choke and second choke;
   operating the inverter during a positive half-wave of the alternating current as an SEPIC converter, so that when providing energy to the output terminal the first and second choke are a part of circuit paths to the output terminal; and
   operating the inverter during a negative half-wave of the alternating current as an CUK converter, so that when providing energy to the output terminal only one of the first and second chokes is a part of a circuit path to the output terminal,
      wherein a current path of the inverter during operation as either SEPIC or CUK is determined by an open or closed state of a single switch of the plurality of switches.

2. A method for operating an electronically controlled inverter, comprising:
   providing an inverter having a plurality of semiconductor switches and a plurality of chokes and a plurality of further circuit elements;
   controlling the semiconductor switches of the inverter for using the inverter alternately as a SEPIC converter and a CUK converter having an end-to-end connection of a neutral output conductor to an input-side negative pole;
   controlling the inverter during a positive half-wave of an output alternating current to use circuit elements to execute the function of a SEPIC converter; and
   controlling the inverter during a negative half-wave of an output alternating current to use circuit elements to execute the function of a CUK converter,
      wherein a current path of the inverter during operation as either SEPIC or CUK is determined by an open or closed state of a single switch of the plurality of switches.

3. The method as claimed in claim 2, wherein the inverter comprises:
   a semiconductor bridge circuit formed from a first, second, third and fourth semiconductor switch of the plurality of semiconductor switches, the semiconductor bridge circuit having a first output and a second output,
      the first output connected to a first terminal of an alternating current output of the inverter,
      the second output connected to a second terminal of the alternating current output of the inverter,
   a first choke having a first side and a second side, the first side connected to a positive pole of a direct current source, the second side connected via a fifth semiconductor switch to a negative pole of the direct current source, an electrical connection between the first choke and the fifth semiconductor switch via a first capacitor to a first terminal of a second choke and to an anode of a diode, an electrical connection between the second terminal of the second choke and a first input of the bridge circuit, an electrical connection between a cathode of the diode and a second input of the bridge circuit, and an electrical connection between the negative pole of the direct current source and the second terminal of the alternating current output.

4. The method as claimed in claim 3, wherein:

during the positive half-wave of the output alternating current, the second and third semiconductor switches are permanently switched on, the first and fourth semiconductor switches are switched off, and the fifth semiconductor switch is switched pulsed, where the first, second, third, fourth and fifth switches are controlled via the microcontroller, and during the negative half-wave of the output alternating current, the first and fourth semiconductor switches are switched on, the second and third semiconductor switches are switched off, and the fifth semiconductor switch is pulsed, where the first, second, third, fourth and fifth switches are controlled via the microcontroller, wherein the fifth switch is the single switch that determines the current path of the inverter during operation as either SEPIC or CUK.

5. An inverter comprising:

a semiconductor bridge circuit formed from a first, second, third and fourth semiconductor switch, having a first output and a second output, the first output is connected to a first terminal of an alternating current output of the inverter, the second output is connected to a second terminal of the alternating current output of the inverter;

a first choke having a first and second side, the first side is connected to a positive pole of a direct current source, the second side is connected via a fifth semiconductor switch to a negative pole of the direct current source;

an electrical connection between the first choke and the fifth semiconductor switch via a first capacitor to a first terminal of a second choke and to a anode of a diode;

an electrical connection between the second terminal of the second choke and a first input of the bridge circuit;

an electrical connection between a cathode of the diode and a second input of the bridge circuit;

a direct electrical connection between the negative pole of the direct current source and the second terminal of the alternating current output; and a microcontroller for controlling the semiconductor switches.

6. The inverter as claimed in claim 5, further comprising:

a microcontroller programmed for operating the converter dependent to the half-waves of the output as a SEPIC converter or a CUK converter.

* * * * *